Figure 2:
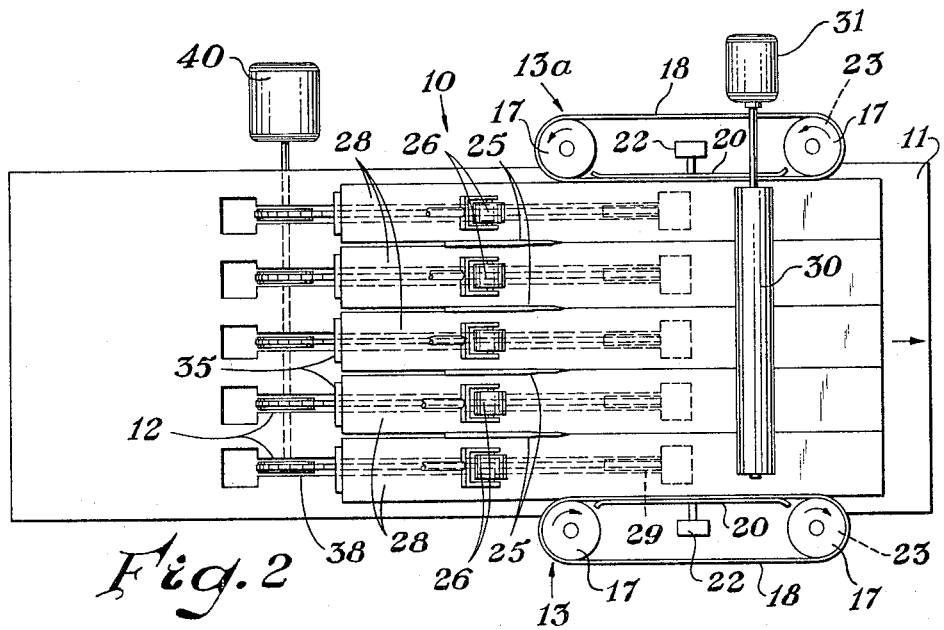

Nov. 1, 1966　　　D. R. WRIGHT　　　3,282,766
APPARATUS FOR EDGE TO EDGE JOINING OF EXPANDED
THERMOPLASTIC RESINOUS PLANKS
Filed May 23, 1963

INVENTOR.
Donald R. Wright
BY
Robert B. Ingraham
AGENT

… … …

United States Patent Office 3,282,766
Patented Nov. 1, 1966

3,282,766
APPARATUS FOR EDGE TO EDGE JOINING OF EXPANDED THERMOPLASTIC RESINOUS PLANKS
Donald R. Wright, Midland, Mich., assignor to The Dow Chemical Company, Midland, Mich., a corporation of Delaware
Filed May 23, 1963, Ser. No. 282,738
6 Claims. (Cl. 156—499)

This invention relates to the edge bonding of foam plastic panels. It more particularly relates to a method and apparatus for the edge sealing of expanded foamed thermoplastic resinous panels.

Frequently, it is desirable to prepare large panels of foamed thermoplastic resinous materials such as in the preparation of prefabricated panels for insulation. Such insulating panels oftentimes have a width of about 4 feet and a length ranging from 8 to about 12 feet. Beneficially, large integral panels of foamed thermoplastic resins or plastic material are employed for construction of insulated enclosures. Generally, foamed thermoplastic resinous material is not conventionally prepared in widths of 4 feet in thickness up to 8 or 10 inches. Therefore, large panels are prepared by joining together smaller panels or planks. Conventionally, to assemble a plurality of planks in edge to edge relationship adhesives are applied to the edges. Some attempts were made to utilize heat sealing wherein adjacent edges were joined by using long heating platens, raising the temperature of the thermoplastic material to its softening point, quickly removing the platens and forcing the softened edges together. For joining thick sections such a technique is generally not satisfactory as this requires intermittent operation and most often the use of two heating platens extending the entire length of the edge being sealed and extending inwardly from either face. Oftentimes this method, as well as being cumbersome, does not result in a satisfactory joint. This technique is generally not conveniently employed where a plurality of planks or panels are to be joined together into a single unitary body in one operation. Generally it is necessary to treat each seal or joint separately. On thick foams, i.e., over about 2 inches, oftentimes uneven heating results in weak joints or partially joined planks. For many critical applications, particularly in the field of low temperature insulation, a uniform joint extending from one side of the foam plank to the other is essential to reduce thermal leakage and provide adequate rigidity.

It is an object of this invention to provide a method and apparatus for the joining of thick thermoplastic resinous foam or expanded sheets in edge to edge relationship.

It is a further object of this invention to provide an apparatus for the joining of thick thermoplastic resinous expanded planks or panels in edge to edge relationship in a continuous manner.

It is another object of the invention to continuously heat seal thick thermoplastic resinous foam plastic planks together in edge to edge relationship with a uniform continuous joint.

These benefits and other advantages are readily achieved in accordance with the method of the invention by positioning a plurality of planks of expanded thermoplastic foam resinous material in spaced edge to edge relationship, progressively heating the edge portions of the planks to be joined to a temperature sufficiently high to cause the thermoplastic resinous material to flow together, resiliently urging the plurality of foamed plastic planks toward one another in a manner which causes the heat softened edges to contact, and maintaining pressure on at least the edges of the resultant sheet until the thermoplastic material has hardened.

The method is most advantageously practiced by utilizing an apparatus in accordance with the invention which comprises a frame having thereon means to support a plurality of expanded thermoplastic resinous planks or panels in spaced edge to edge relationship, means to resiliently urge the panels toward each other, means to maintain said planks in their relative positions and means to heat the generally adjacent edges of the planks to a temperature sufficiently high to cause heat sealing thereof, said means to cause heating having a length substantially less than the total length of the planks being joined.

Figure 1:
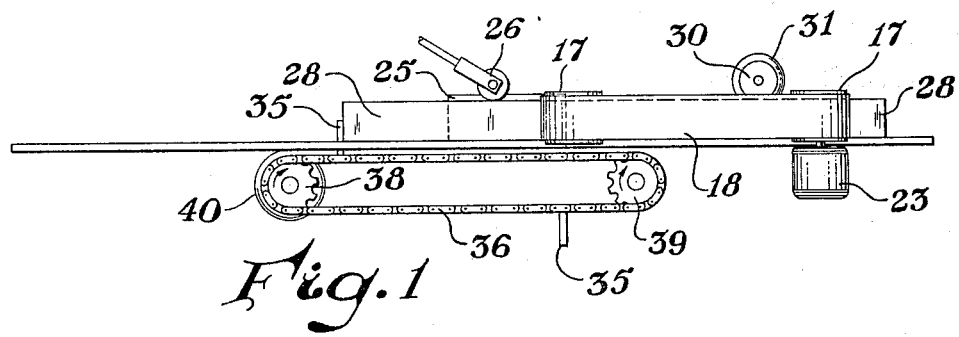
Figures 3, 4:
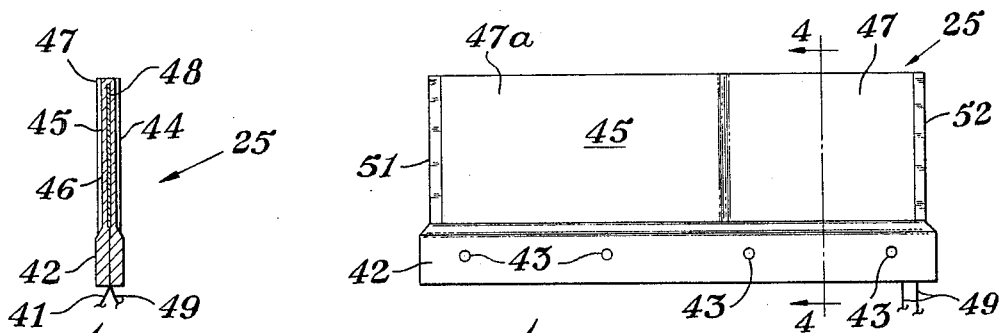

Further features and advantages of the invention will become more apparent from the following specification when taken in connection with the drawing wherein:

FIGURE 1 depicts a schematic side view of an apparatus in accordance with the invention;
FIGURE 2 is a schematic top view of the apparatus of FIGURE 1;
FIGURE 3 is a side view of a sealing platen used in the apparatus of FIGURES 1 and 2;
FIGURE 4 is a schematic cross sectional view of the platen of FIGURE 3.

With reference to FIGURES 1 and 2, there is schematically illustrated a plank joining apparatus generally designated by the reference numeral 10. The plank joining apparatus 10 comprises a table 11 defining in its working surface a plurality of elongated slots 12 in cooperative combination with a plank forwarding and pressure means 13 and 13A. The pressure and forwarding apparatus 13 and 13A each comprise two rolls or sheaves 17 supporting a pressure belt 18 adjacent the table and positioned within the region encompassed by the belt 18 is the pressure shoe 20. Each pressure shoe 20 is urged toward the inner surface of the belt 18 by the tension apparatus 22. The belts 18 are driven by means of the motor 23. A plurality of heating and spacing elements 25 extend generally upwardly and outwardly from the surface of the table 11 at a location adjacent the area between the opposing belts 18. Positioned between each of the elements 25 and adjacent the outermost elements and the belts 18 are a plurality of pressure rolls 26. Also illustrated are a plurality of expanded thermoplastic resinous planks 28. A pressure roll 30 is positioned remote from the elements 25 and generally adjacent one end of the pressure assemblies 13. A plurality of pressure pads 35 are carried on endless flexible members 36 such as chains. The endless flexible members 36 are driven by the sprocket 38 and are supported by the idling sprocket 39. The sprocket 38 is driven by the motor 40.

FIGURES 3 and 4 depict in detail an enlarged view of a heating platen or element 25. The heating platen 25 comprises a body portion 42 having a plurality of mounting holes 43. Rigidly attached to the body portion 42 is a blade 44 having opposed surfaces 45 and 46. Within a portion 47 of the blade 44 is an electric heating element 48 having electric leads 49. A remaining portion 47A of the blade 44 is unheated and serves as a spacing element. The surfaces 45 and 46 converge smoothly to form edges 51 and 52. In operation the heated portion 47 is positioned adjacent to the roll 30 of FIGURE 1 whereas the unheated portion 47A is disposed remote therefrom.

In the practice of the method of the invention a plurality of planks such as planks 28 are placed on the table 11 with the plank engaging plates 35 engaging one end of the plank. By activation of motor 40 the planks are simultaneously pushed toward the platens 25 in such a manner that a platen is located between adjacent planks. The heating portion 47 of the platens 44 are raised to a temperature sufficiently high to melt a small portion of the edge surface of the planks 28 as the plank engaging plates or pads 35 force the planks in a continuous manner underneath the pressure rolls 26 which maintain the plank 28 in engagement with the surface of the table 11. The planks 28 are then gripped by the pressure assemblies 13 and 13A and are forced securely together where the melting surface of the plastic planks cools and hardens. The pressure roll 30 is utilized to maintain the joined planks 28 in contact with the surface of table 11. The heating platens utilized in the apparatus of the present invention must be relatively thin and narrow in order that a practical sealing speed be achieved and sufficiently thin that the deflection of the thermoplastic plank caused by the application of the pressure assemblies 13 and 13A will be insufficient to cause rupture thereof. Preferably the paltens are faced with a material that does not adhere readily to the particular thermoplastic resinous material being joined. In many instances, a coat of polytetrafluoroethylene may be satisfactorily utilized. Beneficially as illustrated in FIGURES 3 and 4 the width of the non-heated spreader portion of the platen is advantageously greater than that of the heated portion. More generally, with relatively rigid materials such as foamed polystyrene, the rate of advance of the planks is often sufficient to scour the surfaces such as 45 and 46 of any molten material which might adhere thereto.

In order to provide a uniform joint, a uniform speed of travel must be maintained of the planks against the heating surfaces. This is most readily achieved by using one or more pads such as the pads 35 which engage the ends of planks and advance them all at an equal rate. In an apparatus such as the apparatus shown in FIGURES 1 and 2, the pads 35 are forwarded by the motor 40 at identical speeds in such a manner that they pass between the heating elements 25 and carry the resultant panel free of the heaters. In order to seal the adjacent edges of the panels together, the planks must be deformed slightly and this is the function of the pressure units 13 and 13A. If the plank such as 28 were completely rigid it would be necessary for the entire edge of the plank to be joined to be heated at the same time as full contact of the edge would be obtained only after the heater were removed from between the planks. By taking advantage of a thin spacing and heating element and the elasticity of the rigid planks the pressure assemblies 13 and 13A exert sufficient force on the edge of the planks 28 to cause them to abut in a region very close to the heating element 25. Thus the edges of the planks are moved past the heating element 25, the edge is brought to a heat sealing temperature and while still at the heat sealing temperature the edge portions are brought together by means of the pressure from the pressure assemblies and maintained together until they have cooled below the plastic or heat sealing temperature of the material being joined. The pressure roll 30 is utilized to maintain the plurality of planks such as 28 in engagement with the flat surface or table 11 in order that as they cool no buckling or bowing can be observed across the face of the sheet. Similarly the pressure rolls 26 maintain the planks in contact with the surface of the table 11, adjacent the heating elements. Generally the heating elements employed have a relatively thin cross section in a direction perpendicular to the sealing face. Beneficially such elements are electrically heated or alternately they may be provided with means to circulate a heat exchange fluid such as oil or the like within the element. For rapid heating it is generally advantageous to use electrical resistance heaters which can achieve relatively high surface temperatures for rapidly raising the edges of the planks to a sealing temperature. For example, in sealing polystyrene foam 110 volt, 500 watt knife type heating elements such as the elements 25 operating at an input of 180 watts provide a surface temperature of about 935° Fahrenheit which is adequate to seal 4 inch thick polystyrene passing the surface of the heater at a rate of about 30 feet per minute. Although the spreader and heater are incorporated into one unit for mechanical convenience, this function may be accomplished by separate closely adjacent units.

Using an apparatus as shown in the drawing, foamed polystyrene planks having a density of about 1.8 pounds per cubic foot, 4 inches in thickness, 12 inches in width and 12 feet long were readily sealed together in edge to edge relationship utilizing the hereinbefore mentioned operating conditions. The pressure assemblies 13 and 13A are adjusted to provide sufficient pressure to maintain the portions of the planks between them in parallel relationship while the remaining portion of the planks adjacent the heaters and a portion remote from the heaters are bent slightly outwardly.

In a similar manner other foamed resinous thermoplastic plank material is readily joined together in edge to edge relationship to form sheets of relatively large dimension. Polymeric foamed thermoplastic resinous materials made from polyolefins such as polyethylene, polypropylene, resinous copolymers thereof, polyvinyl chloride, saran (a copolymer of vinyl chloride and vinylidene chloride such as, for example, a copolymer containing 85 percent vinyl chloride, 15 percent vinylidene chloride) are readily joined in accordance with the invention.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for joining expanded thermoplastic resinous planks in edge to edge relationship comprising in cooperative combination
   an elongated table having a working surface, a first end and a second end, said table defining in its working surface a plurality of elongated slots extending from said first end toward said second end,
   a pad disposed within each of said slots adapted to engage the terminal portion of a plank to be joined,
   each of said pads being supported on an endless belt, said belt being adjustably connected to a drive shaft positioned remote from said working surface (each of said slots terminating toward said second end in a pad passing opening), said shaft being cooperatively connected to drive means,
   a plurality of elongated heating elements extending generally vertically from said table surface and positioned generally adjacent the slots, each of said elements being positioned generally centrally between and parallel to adjacent pairs of slots,
   each of the elements having smooth generally parallel surfaces and heating means located therein,
   a plurality of pressure rolls positioned adjacent the terminal portions of said slots disposed adjacent each of said heating elements in such a manner that a plank having an edge portion passing adjacent the heater is resiliently urged toward the working surface,
   a pair of pressure means oppositely disposed to each other on adjacent sides of said table, said pressure means being positioned remote from said slots and generally adjacent the terminal portions of said heaters toward said second end and adapted to resiliently urge the planks together in edge to edge relationship after said planks have been moved past said heaters, each of said
   pressure means comprising a pair of spaced sheaves having an endless belt positioned therebetween, said belt having a generally flat configuration and having its major flat portions disposed in a plane generally parallel to the plane of the heating elements, said belt adapted to engage the outer edges of an assembly of a plurality of planks positioned on said working surface, a pressure shoe disposed within said belts adapted to force said belts against said plank edges, a pressure roll positioned adjacent the surface of said table and adapted to force a plurality of planks into contact with the surface of said table, said roll having an axis generally perpendicular to a plane containing said heating elements, said roll being adapted to frictionally engage and to move said planks away from said heaters toward said second end of said table, and means to space said planks adjacent said heaters and remote from said pressure means.

2. The apparatus of claim 1 wherein said heating elements terminate toward said pressure means in a heating portion and remote from said pressure means is an unheated spacing means.

3. An apparatus for the sealing of expanded thermoplastic resinous planks or panels in edge to edge relationship comprising means to support a plurality of planks in edge to edge relationship, means to resiliently urge the edges of the planks toward each other comprising opposed pairs of sheave members, each pair of sheave members having an endless belt adapted to engage the edge portion of the plank, means to maintain the planks in their relative positions and means to heat the generally adjacent edges of the planks to a temperature sufficiently high to cause heat sealing thereof, said means to cause heat sealing having a generally elongated plate-like configuration and a length substantially less than the total length of the planks being joined and means to space said planks adjacent said heating means and remote from said means to resiliently urge the edges of the planks together.

4. The apparatus in accordance with claim 3 wherein means to support the plurality of expanded thermoplastic resinous planks comprises a generally flat surface having adjacent thereto a plurality of generally parallel heating and spacing elements each adapted to pass between adjacent plank edges to be joined.

5. An apparatus in accordance with claim 3 wherein a plurality of adjustable shoes are included which are adapted to engage the end terminal portions of the planks and force them between the heating means.

6. An apparatus in accordance with claim 3 wherein the means to heat the planks comprises a generally plate-like electrical heater.

References Cited by the Examiner
UNITED STATES PATENTS

| | | | |
|---|---|---|---|
| 2,438,685 | 3/1948 | Stevens | 156—304 |
| 2,711,780 | 6/1955 | Hakomaki | 156—306 X |
| 3,180,778 | 4/1965 | Rinderspacher et al. | 156—311 |

EARL M. BERGERT, *Primary Examiner.*

HAROLD ANSHER, *Examiner.*